March 29, 1966 A. K. MOULTON 3,243,042
SCREEN SUPPORTING FRAME
Filed Nov. 29, 1962 3 Sheets-Sheet 1
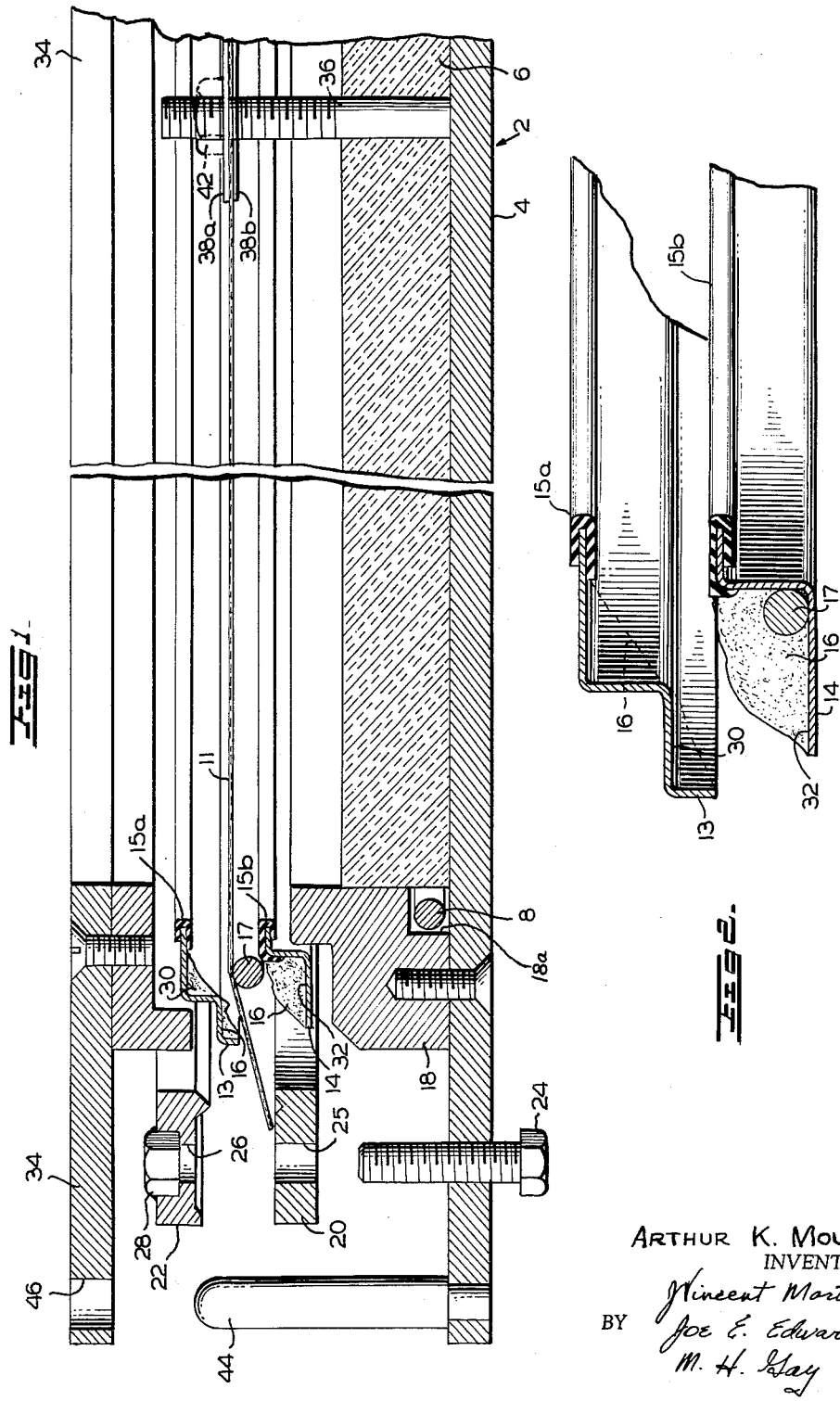
ARTHUR K. MOULTON
INVENTOR.
BY March 29, 1966 A. K. MOULTON 3,243,042
SCREEN SUPPORTING FRAME
Filed Nov. 29, 1962 3 Sheets-Sheet 2

ARTHUR K. MOULTON
INVENTOR.

BY J. Vincent Martin
Joe E. Edwards
M. H. Gay

March 29, 1966  A. K. MOULTON  3,243,042
SCREEN SUPPORTING FRAME
Filed Nov. 29, 1962  3 Sheets-Sheet 3
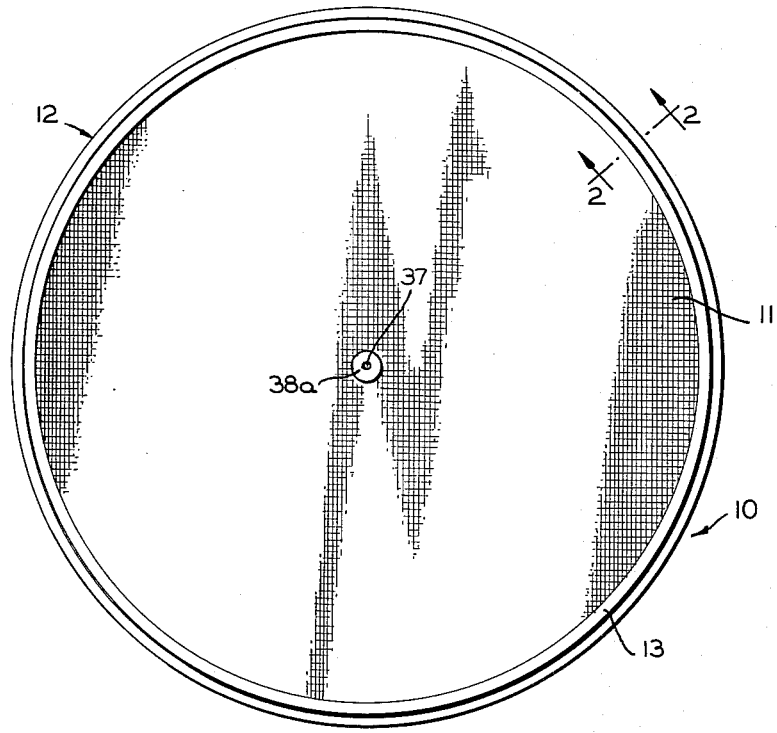
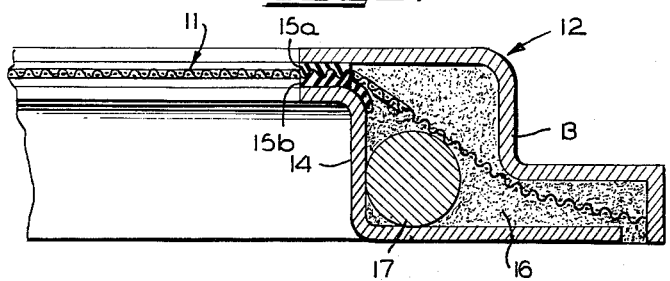
ARTHUR K. MOULTON
INVENTOR.
BY

United States Patent Office 3,243,042
Patented Mar. 29, 1966

3,243,042
SCREEN SUPPORTING FRAME
Arthur K. Moulton, Houston, Tex., assignor, by mesne assignments, to Southwestern Engineering Company
Filed Nov. 29, 1962, Ser. No. 241,009
3 Claims. (Cl. 209—403)

This invention relates generally to screen structures for material separators and classifiers, and more specifically to an improved supporting frame.

Material separator and classifier screen frames are generally fabricated of a thick stainless steel stock having cross-sectional properties to provide sufficient strength to support the screen in a taut, pre-tensioned manner under loading of the material processed through the screen. The screen is pre-tensioned so that it will possess the desired physical operating characteristics when used in the usual vibrating classifier or separator. The stainless steel is generally required to provide a surface resistant to corrosive materials or non-contaminating to food stuffs that may be processed therethrough.

Utilizing the present methods of construction, these requirements necessitate a heavy, costly frame which is not readily amenable to connection to the screen structure and generally requires fabrication by forging, milling or other relatively expensive types of forming. The methods of connection of the screen to these types of frames generally involve spot welding or like processes which result in the weakening of the screen structure near the point of the welds. This method also provides, at best, concentrated points of support and therefore concentrated points of stress in individual elements making up the screen.

It is therefore an object of this invention to provide an inexpensively formed load bearing screen and frame structure for classifiers or the like wherein the screen is held in a pre-tensioned state.

It is a further object of this invention to provide corrosion-resistant and non-contaminating classifier screens or the like which, because of their frame structure, do not require heavy cross-sections of corrosion-resistant material and permit substantial savings in construction materials.

It is another object of this invention to provide a classifier screen or the like in which the frame thereof is joined to the screen in a continuous and strong manner eliminating separated concentrated points of stress.

It is still a further object of this invention to provide a construction for a load bearing pre-tensioned screen and frame combinations which enable the elements thereof to be joined by adhesive material.

Other objects and many of the attendant advantages of this invention will be more fully understood from the following detailed description.

These objects are accomplished by the present invention which provides a new and improved article for providing an easily formable and inexpensive frame for material separators, classifiers and the like by the combination in a screen frame structure of a pair of relatively thin corrosion-resistant facing frames laminated about the periphery of the pre-tensioned screen and a mild steel structural member therebetween. The components are bonded together by a filling of adhesive to provide a unitary, strong, corrosion-resistant, and inexpensive frame structure. A minimum of the more costly corrosion-resistant material is utilized while ample strength is provided to satisfy the structural requirements of the system.

The following description is of a specific embodiment of the present invention and may be understood by reference to the accompanying drawings in which like numbers indicate like parts thereof, and wherein:

FIG. 1 is an exploded elevational view of an embodiment of the invention in section and partially broken away, showing the screen, frame and assembling apparatus therefor prior to assembly thereof;

FIG. 2 is a cross-sectional elevational view of a portion of the screen and rim embodying the features of this invention, prior to assembly thereof;

FIG. 4 is a plan view of the screen structure in its final configuration; and

FIG. 5 is a cross-sectional side view of a portion of the screen and rim taken along line 2—2 of FIG. 4.

Figure 3:
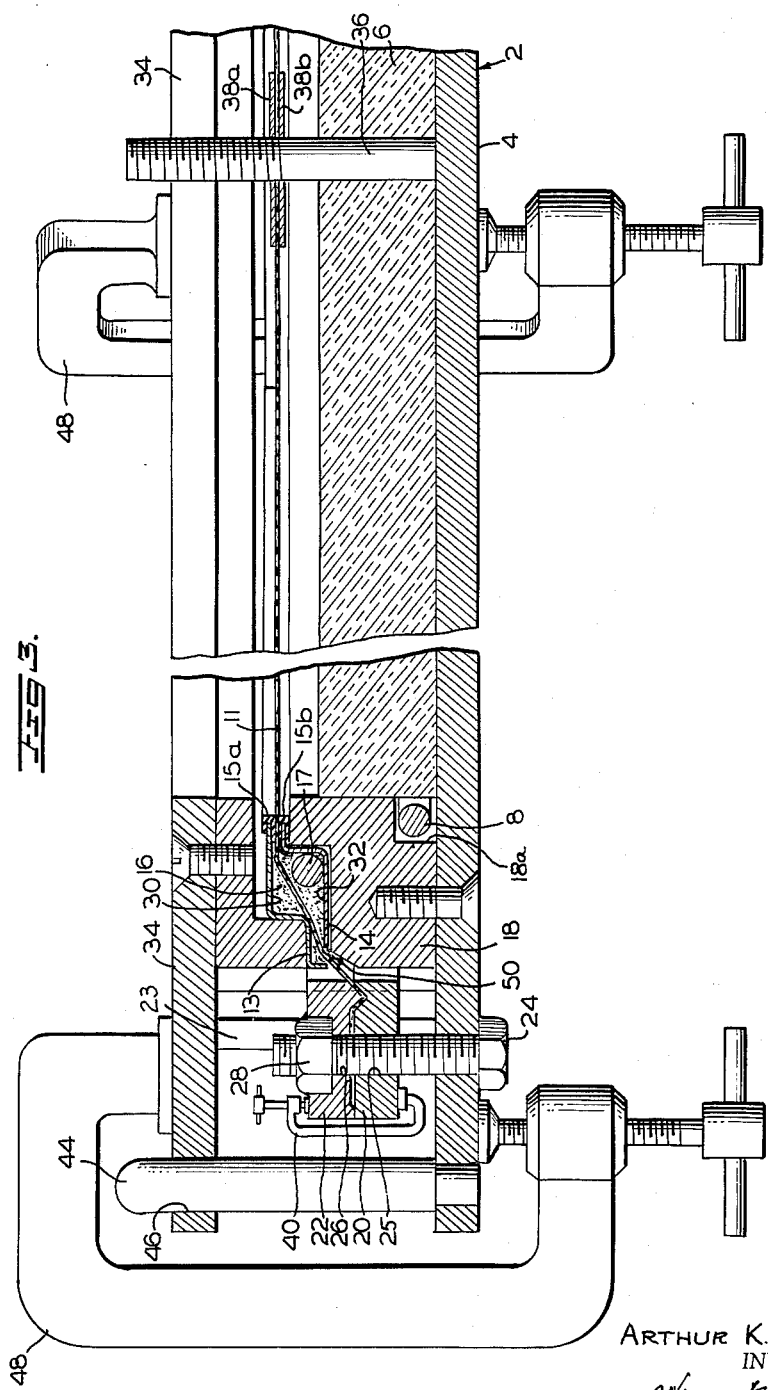
FIG. 3 is an elevational view partly broken away and in section of the assembling device and the screen structure after assembly thereof.

Referring now to FIG. 1 of the drawings, an apparatus for assembling a circular screen and rim structure, shown generally 2, comprises base portion 4 having a circular insulation board 6 disposed thereon with a surrounding annular lower jig member 18 connected to the upper surface of base 4. An annular heating element 8 surrounds the circular insulation board 6 and is disposed in a suitable groove 18a in the lower jig member 18 for providing heat to such jig member as will be more fully described hereinafter. Insulation board 6, formed of a suitable insulation mat, serves to concentrate the heat from heating element 8.

Lower and upper screen clamping rings 20 and 22 respectively, and clamp ring pull-down bolt 24 are shown in an exploded view, prior to assembly thereof. Clamp rings 20 and 22 are provided with holes 25 and 26 therethrough spaced at suitable intervals around the rings. Upper clamp ring 22 is provided with a threaded nut 28 brazed thereto at each pull-down hole 26.

The jig members and clamp rings are preferably fabricated from steel or a material having similar cost, structural strength and dimensional stability. While the heating element 8 is preferably of the electrical resistance type, any suitable heat source will achieve the purpose.

Screen 11 is shown disposed between the upper and lower clamp rings 22 and 20, and positioned for clamping thereby. Upper and lower facing members 13 and 14 respectively and reinforcing member 17 are disposed in a pre-assembled condition above lower jig member 18. Adhesive 16 is shown initially deposited on the lower and upper portions of facing member 13 and 14 respectively. Upper jig member 34 is shown disposed above the unassembled screen and rim components prior to assembly thereof.

As stated before, the substances often handled by material separators and classifiers are either of a corrosive nature or are in the nature of a food product which must not be contaminated by the material through which it is processed. Therefore, the surfaces of the screen structure presented to the material handled should be of a corrosion-resistant and non-contaminating nature, preferably stainless steel. Of course, other materials having similar inert characteristics could be used and it is contemplated that aluminum, plastic, or like materials would suffice where wear is not a governing factor. In the case of non-corrosive environments, or applications where corrosion problems are not presented, mild steel could be utilized for the facing members as well. Since strength is not critical, due to the improvements made possible by this invention, the members may furthermore be fabricated from stock thin enough to be formed by a metal spinning process or the like to provide low cost forming.

Screen 11 may be fabricated from screen wire cloth of any type metal that is available. In processes requiring an inert non-corroding type of screening, stainless steel wire cloth is desirable.

Reinforcing member 17 is preferably fabricated from a low carbon steel and may be of any cross-sectional configuration that is readily available in stock. In the embodiment shown in the drawings, a rolled and welded rod hoop is utilized to reinforce the rim structure. The cross-sectional diameter of the rod is determined by the stability needed which, in turn, depends on the total diameter of the screen structure. It has been found, for instance, that a ¼ in. diameter rod is suitable for 18, 24 and 30 inch diameter screens, while a 48 inch diameter screen may require a ⅜ in. diameter rod, and a 60 inch diameter screen a ½ in. diameter rod.

Upper and lower gasket members 15a and 15b respectively, are provided on the inner edges of facing members 13 and 14 and screen 11 to prevent metal-to-metal contact between the screen wire and the facing members. This prevents wear and work hardening of the wire screening by allowing a more gradual flexing radius. These gaskets may be fabricated from any plastic or elastomeric material suitable for the purpose such, for example, as an elastomeric vinyl polyolefins or equivalent material. They may be formed, as shown in FIG. 1, to be self retaining over their respective facing members during assembly thereof.

It is important that the surfaces to be bonded be suitably prepared to receive the bonding material prior to application of the adhesive thereto. In this respect, rough sandblasting of the inner surfaces 30 and 32 of facing members 13 and 14 respectively, insures a good bonding surface. Wire screen 11 should be cleaned along the required peripheral area with a solvent of a type suitable to clean the surface and particularly to remove oil deposited thereon during manufacture.

Adhesive 16 is liberally applied to surface 30 of member 13 and surface 32 of member 14. Although any suitable adhesive may be used for this purpose, heat-setting adhesives are preferred and a heat-setting epoxy resin of the type marketed under the trade name "KEMAK, Hard-Set" has been found to be suitable for use with the invention. Of course, where a heat-setting adhesive is not used, the heating element 8 is not needed since its function is to cure the adhesive.

Referring now to FIG. 2 the components of the rim and screen are shown in an enlarged cross-sectional view immediately prior to assembly thereof. Reinforcing member 17 is depressed into adhesive 16 to fit closely over the lower facing member 14 and bottom against surface 32. Gaskets 15a and 15b are placed in position over the inner rim of member 13 and 14 respectively. Their configuration enables their retention during the assembly process without the necessity of adhesive or other holding fixtures.

FIG. 3 is a view of the portion of the components of FIG. 1 in a fully assembled condition. Prior to assembly of member 14 on jig 18, a silicone release agent should be applied to surfaces of the jigs which may come in contact with adhesive 16 during assembly to prevent adhesion of any excess adhesive thereto.

In order to enable proper pre-tensioning of screen 11, which is desired with larger diameter screen and frame structures, a pull down stud 36 is provided in the center of base 4. A hole 37 is provided through the center of screen 11, prior to assembly, to accommodate stud 36. Upper and lower washer assemblies 38a and 38b respectively surround the hole 37 to strengthen and reinforce the screen 11 at that point.

Screen 11 is formed in a circular configuration with a larger diameter than the inner diameter of the clamping rings 20 and 22 and is locked between the rings by small clamps 40 suitably spaced around the periphery thereof prior to assembly of the structure. In order to insure an even distribution of screen within the periphery of the rings, a gauge circle, equal in diameter to the inner edges of rings 20 and 22, may be marked on screen 11 to provide a guide for locating the rings.

Assembly and pre-tensioning of the screen is accomplished by disposing the pre-assembled clamping rings and screen assembly, with stud 36 disposed through hole 37, over base 4 and connecting ring pull-down bolts 24 to the threaded nuts 28 of upper clamp ring 22. Then bolts 24 are tightened until equal tension is imparted in screen 11. By threading center pull-down nut 42 (shown in phantom view in FIG. 1) over stud 36 and tightening against upper washer 38a, screen 11 may be deflected downward to achieve desired pre-tension thereof while the screen is in the position which it assumes in use in the usual vibrating classifier or separator. When this deflection has been achieved, pull-down bolts 24 are tightened to provide a final symmetrical tension on the periphery of screen 11. At this point, pull-down nut 42 is backed off and removed to allow screen 11 to return to a substantially planar configuration (as in FIG. 3) and the desired pre-tension is imparted into the elements of the screen.

With the screen and pull-down clamping rings 20 and 22 in position, and the tension of screen 11 adjusted as above by suitable tightening of bolts 24, upper facing member 13, suitably prepared with gasket 15a and adhesive 16, is then placed over screen 11 and lower facing member 14. Upper jig 34 is then lowered onto upper facing member 13. Guide pins 44, at least two of which are mounted on base 4 project through guide holes 46 in upper jig member 34 to insure alignment of the jig members and the component parts of the screen and rim assembly.

Referring now to FIG. 3 the jig members and screen and rim members are shown in their fully assembled condition. Pressure is applied the structure by C clamps 48, disposed at suitable intervals around the periphery of the jigs. Gauge blocks 23, suitably disposed between upper jig member 34 and lower jig member 18, may be used to insure proper final compression of the structure and adequate uniform spacing between the facing members 13 and 14. Excess adhesive is extruded in the form of flashing 50 through the gap between members 13 and 14. While the assembly is held in compression, heat is applied to the adhesive through heating element 8 until it is fully cured. It has been found that, with the epoxy resin specified earlier, a curing period of from 20 to 30 minutes at about 250° F. is sufficient to provide complete curing of the resin.

After curing, the jigs and clamping rings are unlocked and the screen and frame assembly is removed. Removal of the excess adhesive flashing 50 and the extending edge portion of screen 11 is achieved by grinding. Since both the adhesive and the stainless steel are ground simultaneously, a special wheel, porous enough to retard filling of the pores of the wheel by the adhesive, yet hard enough to cut the stainless steel wire may be used.

As a final step the protruding portions of gaskets 15a and 15b are trimmed away by knife or other suitable means to prevent any void that might trap material, particularly food products, and possibly contaminate the system.

In FIG. 4 the final configuration of the entire screen, referred to generally at 10, is shown in plan view. It comprises a frame, shown generally at 12 and screen 11. FIG. 5 is a cross-sectional view of the portion of the completed screen and frame taken along the lines 5—5 of FIG. 4. Adhesive 16 occupies the space between members 13 and 14 bonding them, as well as screen 11 and reinforcing member 17, in one, unitary structure. Although in FIG. 5 the adhesive 16 is illustrated as completely filling the space between the facing members 13 and 14, it has been found that in actual practice the space need not be filled in order to provide a unitary structure, and therefore there may be a void in the space between the facing members 13 and 14, particularly in the space just below the upper horizontal portion of the facing member 12 as viewed in FIG. 5.

This invention, therefore, provides a simple, inexpensive material separator screen structure having the required strength characteristics and, where necessary, utilizing a minimum of costly corrosion-resistant materials. The components are additionally formable in a simple and inexpensive manner. The invention also provides a method for attaching the screen mesh to rim structure which yields a continuous, non-localized stress on all elements of the screen and does not cause a weakening of the structure by requiring welding or like connection of components.

It should be understood that modifications and variations of this invention are possible and that the invention may be practiced otherwise than as specifically described in keeping with the spirit and scope of the invention as set forth in the above exemplary detailed description.

What is claimed is:

1. A screen structure for a material classifier comprising:
   (a) annular lower and upper screen facing members, said facing members being formed of metal of substantially uniform thickness;
   (b) each facing member including a cylindrical section, an upper planar section and a lower planar section joined to the axial extremities of said cylindrical section, the corresponding sections of said facing members being disposed in confronting relation when said facing members are assembled by moving said cylindrical sections into axially overlapping relation;
   (c) said upper planar sections being radially inwardly directed, and said lower planar sections being radially outwardly directed;
   (d) and a circular screen having a margin entering between said upper confronting sections and initially emerging from said lower confronting sections;
   (e) and means between said facing members for securing said screen by its margin upon axial assembly of said facing members.

2. A screen structure according to claim 1, wherein:
   (a) said securing means is a castable plastic material interposed between said facing members and filling the interstices of said screen margin.

3. A screen structure according to claim 1, wherein:
   (a) said cylindrical sections and adjacent sections of said upper and lower planar sections define an annular cavity;
   (b) an annular reinforcing ring is disposed in said cavity;
   (c) and said receiving means is castable plastic material also disposed in said cavity and filling the interstices of that portion of the screen contained in said cavity.

References Cited by the Examiner

UNITED STATES PATENTS

| | | | |
|---|---|---|---|
| 2,015,087 | 9/1935 | Rafton | 209—403 |
| 2,070,998 | 2/1937 | Odom | 209—403 X |
| 2,136,950 | 11/1938 | Overstrom | 209—403 |
| 2,283,574 | 5/1942 | Pillsbury | 160—380 |
| 2,343,037 | 2/1944 | Adelman | 160—380 |
| 2,417,586 | 3/1947 | Crosley | 156—163 |
| 2,620,289 | 12/1952 | Douglas | 156—163 |
| 2,753,999 | 7/1956 | Miller | 209—493 |
| 3,047,153 | 7/1962 | Zelinski | 209—408 |
| 3,070,230 | 12/1962 | Peterson | 209—382 X |

FOREIGN PATENTS

| | | |
|---|---|---|
| 519,311 | 12/1952 | Canada. |
| 1,262,836 | 4/1961 | France. |
| 676,308 | 7/1952 | Great Britain. |

FRANK W. LUTTER, *Primary Examiner.*

HARRY B. THORNTON, *Examiner.*

R. HALPER, *Assistant Examiner.*